June 25, 1946.   H. C. ROTERS   2,402,580
HIGH SPEED RELEASE SYSTEM
Filed July 2, 1941
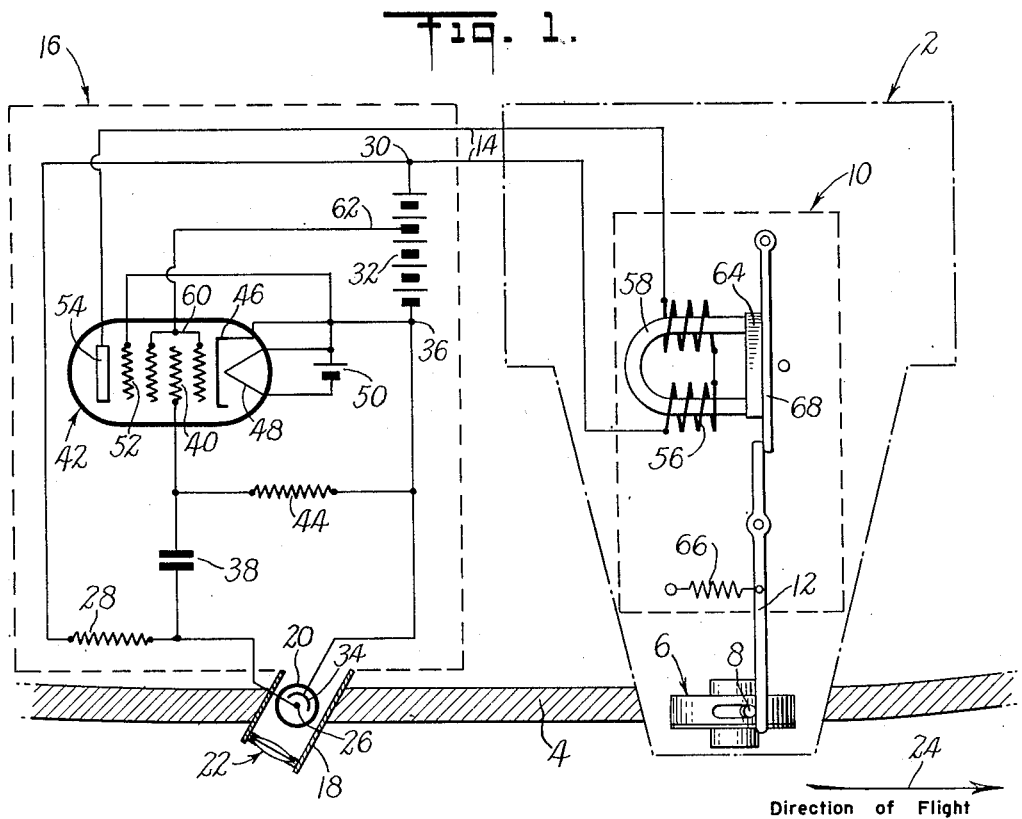
INVENTOR
*Herbert C. Roters*
BY
*Blair, Curtis & Hayward*
ATTORNEYS Patented June 25, 1946

2,402,580

UNITED STATES PATENT OFFICE 2,402,580

HIGH-SPEED RELEASE SYSTEM

Herbert C. Roters, Roslyn Heights, N. Y., assignor to Fairchild Camera and Instrument Corporation, a corporation of Delaware Application July 2, 1941, Serial No. 400,807

3 Claims. (Cl. 67—29)

This invention relates to a method of and apparatus for effecting the high speed release of a body magnetically held against the bias of a large force, and more particularly to a method of and apparatus for controlling the operation of a camera shutter with such apparatus.

In a broad sense, my invention deals with the problem encountered in many automatic devices which depend for actuation upon the release of a member in response to a minute force, and more particularly to the change of an electrical value. The actuation of such devices necessitates an expenditure of energy which normally is time consuming. Where mechanical motion is involved, it is necessary to overcome inertia and accelerate masses. This requires a finite period of time and, of course, a force which is inversely proportional to the square of the time allowed. Where it is necessary to make an electrical contact, a relay or the like must be energized, and the amount of time required for such energization is a function of the power input. Furthermore, where a relay is involved, in order for the relay to function some mechanical motion must occur, and this also requires time. Hence a definite and measurable time interval is ordinarily required to change such automatic devices from an inoperated to an operated state.

In accordance with my invention, the release of a member in such automatic devices may be accomplished substantially instantaneously without any mechanical motion and with the utilization of negligible power by magnetically holding the member to be released and deenergizing the holding magnet by electronic control apparatus.

It is accordingly an object of this invention to provide apparatus of the above nature capable of releasing a member magnetically held against the bias of a strong force substantially instantaneously upon the application of negligible electrical power and without applying any mechanical motion. Another object is to provide apparatus of the above nature characterized by simplicity and durability which overcomes the difficulties referred to above.

For illustrative purposes I will describe the principles of my invention as applied to camera operation for night aerial photography, although it will be apparent that my invention is applicable to other apparatus in which high speed release functions are important. In this connection it should be noted that by "high speed release" I mean release in the neighborhood of one one-thousandth of a second or less.

Night photography and particularly aerial night photography in most instances requires the use of brilliant flares for the illumination of the subject being photographed. Flares of various types are used, but the most effective, i. e., the most brilliant, are those which burn with an explosive effect through a total period of on the order of less than one-tenth of a second. Although these flares burn through only a minute portion of a second, they develop a tremendous peak illumination during this short period and the period of this peak illumination is, of course, of substantially less duration than the total period of illumination, usually only lasting for about twenty-thousandths of a second. It is in the period immediately preceding this peak illumination that the camera shutter should be opened. This requires extremely accurate synchronization of camera shutter operation and the period of peak illumination, and extremely rapid actuation of the shutter mechanism prior to that period.

In the past attempts have been made to control the camera shutter by using a camera shutter operating mechanism actuated by a light sensitive cell responsive to the light emitted by the flare. The difficulty in using such a mechanism lies in the delay which occurs between the time the light impinges on the cell and the time when the shutter actuating mechanism actually operates. Such delay is occasioned because such shutter actuating devices usually are characterized by the use of an electromagnetic device such as a solenoid which, when energized by the amplified output of the photocell, moves a plunger or armature to operate the camera shutter. It takes a measurable amount of time to build up the current in the solenoid to an effective value, and due to inertia of the parts additional time is required for the full effective stroke of the solenoid armature to take place. The sum of these times amounts to a substantial period subsequent to cell energization which in many cases exceeds the time between the beginning of the illumination period of the flare and the instant of peak illumination, with the result that the camera shutter is opened subsequent to the time of the flare's maximum brilliancy. Hence, much of the flare's useful illumination is wasted. Attempts have even been made to start the shutter actuating operation before the flare goes off, but synchronization of exposure with peak illumination in such apparatus is extremely difficult if not impossible to attain with any degree of accuracy except as a matter of chance.

It is, therefore, a further object of this invention to provide an improved high speed light-operated camera shutter mechanism especially adapted to be used for aerial night photography in synchronism with explosive flares of short duration.

Other objects and advantages of this invention will be in part obvious and in part pointed hereinafter and may be more readily understood by reference to the accompanying specification and drawing in which:

Figure 1 is a diagrammatic showing of an embodiment of my invention applied to an aerial camera, including a schematic wiring diagram of the electrical apparatus; and Figure 2 shows a typical light-intensity-time characteristic curve of a flare of the type frequently used for night aerial photography.

Referring to Figure 1, an aerial survey camera of any suitable type, schematically indicated at 2, is mounted in the usual manner in the belly of an aircraft, a section of which is shown at 4. The camera 2 is provided with a shutter mechanism, generally indicated at 6, which may be of any standard variety, actuated by a lever 8 which, in the arrangement shown in the drawing, must be moved to the left to operate the shutter 6. A magnetic shutter release mechanism, generally indicated at 10, is secured to the camera so that its operating member 12 is positioned to actuate the shutter lever 8. The magnetic shutter release mechanism 10 is connected by leads 14 to a photoelectrically-operated electronic control unit and power supply, generally indicated at 16, which is also preferably positioned in the belly of the aircraft as shown in the drawing.

The electronic control unit 16 is provided with a light receiving conduit 18 having a photoelectric tube 20 positioned in its upper end. This conduit 18 may be provided with an optical system, generally indicated at 22, for directing light impinging upon the end of the conduit onto the active portion of the photocell 20. The light receiving conduit 18 projects through the bottom 4 of the aircraft and is preferably tilted slightly from the vertical toward the stern of the aircraft. This for the reason that the apparatus is adapted to be actuated by the light of a photographic flare dropped from the aircraft in flight. When a flare is dropped, it falls rapidly astern. Thus, when it goes off, it is some distance behind the plane and therefore the light conduit 18 is preferably pointed in the general direction of the probable igniting position of the flare, i. e., approximately in the direction shown in Figure 1, assuming the direction of flight indicated by the arrow 24.

The circuit, shown diagrammatically in Figure 1, for the phototube 20 has proven satisfactory in actual operation. The anode 26 of the phototube 20 is connected through a high resistance current limiting resistor 28 to the positive terminal 30 of a "B" battery 32 or any other suitable source of high potential, and the cathode 34 of the phototube 20 is connected to the negative terminal 36 of the battery 32. The anode 26 of the phototube 20 is also connected through a condenser 38 to the control grid 40 of a screen grid pentode tube 42. The control grid 40 is also connected through a grid leak resistor 44 to the negative terminal 36 of the battery 32. The cathode 46 of pentode 42 is likewise connected to the negative terminal 36 of battery 32. The cathode 46 may be the filament of the tube 42, or, as in the circuit shown, it may be an indirectly heated cathode heated by a suitable heater element 48 connected to a suitable source of heating current such as the battery 50, one terminal of which is preferably connected to the negative terminal 36 of the battery 32. The suppressor grid 52 is connected to the cathode 46. The anode 54 is connected through a winding 56 of a shutter release magnet 58 of the magnetic shutter release device 10 to the positive terminal 30 of battery 32. The screen grid 60 is connected to a suitable intermediate potential tap 62 on the battery 32.

The magnetic shutter release device, shown diagrammatically at 10, comprises a U-shaped holding magnet 58 formed of highly permeable magnetic material, such as ferro-nickel, and provided with an energizing winding 56. When reference is made herein to a "holding magnet," it is to be understood that such reference is to an electro-magnet which does no appreciable work when performing its desired function and one which must be supplied with only such power as is needed to overcome such losses as result from heating, leakage flux, and the like. Such a magnet is not to be confused with a "tractive magnet" which, upon energization in order to perform its desired function, must move some object through a finite distance and which must be supplied not only with the energy to overcome such losses as result from heating, flux leakage, and the like, but also with the energy necessary to do the work of moving the object through the specified distance. When energized this holding magnet 58 is adapted to hold an armature 64 mounted on a pivoted lever 68 against the force of a strong shutter release spring 66 pulling on a pivoted shutter operating member 12. The shutter operating member 12 is adapted to instantaneously move the shutter actuating lever 8 to the left to operate the shutter 6 under the force of the shutter release spring 66 when the shutter release magnet 58 is deenergized.

With this arrangement when the phototube is dark and hence its anode-cathode current is zero, the condenser 38 is charged to the full potential of battery 32 and therefore the potential on the control grid 40 is the same as the potential on the cathode 46 so that the normal plate current of the pentode 42 flows through the winding 56 of magnet 58, thereby holding the armature 64 of the magnetic shutter release mechanism 10 in position against the strong pull of shutter release spring 66. When a strong light flash strikes the phototube 20, such as the flash from the explosion of a photographic flare dropped from the aircraft, current flows between the anode 26 and the cathode 34 of the phototube 20. During the first instant of such current flow the voltage across condenser 38 remains substantially constant, and therefore this current is supplied simultaneously from the battery 32 through resistance 28 and from condenser 38 through grid leak resistance 44. This initial flow of current through the grid leak resistor 44 causes the control grid to assume a negative potential with respect to cathode 46 and thereby causes the anode-cathode current of pentode 42, flowing through winding 56 of the holding magnet 58, to drop to a very low value so that the magnetic attraction of magnet 58 is not sufficient to hold the armature 64 against the pull of shutter release spring 66. Thus armature 64 is released and permits lever 68 to pivot. This pivoting of lever 68 effectively unlatches shutter-operating member 12 which rotates in a clockwise direction under the strong pull of the shutter release spring 66 and thus substantially instantaneously moves shutter actuating lever 8 to operate the shutter 6.

All of the above-described operations occur almost instantaneously because of the inherent non-lagging inertialess characteristics of the system. The instant that light of sufficient intensity strikes phototube 20 the holding magnet 58 is deenergized. By finely machining the pole faces of holding magnet 58 and the surface of the armature 64 which abuts against these pole faces, the length of the air gap therebetween can be reduced to a minimum so that the holding magnet can develop a very large pull against the armature with the expenditure of relatively little power in the energizing coil 56. Thus, upon decrease of the anode-cathode current of tube 42 which causes deenergization of the magnet 58, the release of armature 64 is almost instantaneous because negligible time is required to deenergize the magnet because of its small energy storage. This deenergization time is further decreased by the use of the vacuum tube 42 because of its high circuit resistance. A pentode type vacuum tube is preferably used because it has such an inherently high dynamic plate resistance when the grid goes negative. Further, because of the design of the holding magnet to permit a large pull for small power expenditure, it is possible to use a very strong shutter release spring 66 so that a large source of potential energy is available to move the shutter-operating mechanism when the holding magnet is deenergized. Thus, the elapsed time necessary to move this mechanism to operated position is also negligible. Actual measurements made with a shutter release system of this type have shown that the shutter can be made to start opening in less than one one-thousandth of a second after a light flash of sufficient intensity strikes the phototube. This is many times the best speed of operation available in previously known apparatus of this type.

The necessity for such great speed of operation of a light-operated shutter-release mechanism can be more fully appreciated by considering the characteristics of the photographic flares used with such apparatus. It is obvious that for any type of aerial photography, because of the vibration and the high speed motion of the camera due to movement of the aircraft encountered in such photographic work, exposures of short duration are desirable in order to obtain clear photographs. Further, when the large areas to be covered are considered, it is obvious that for night aerial photography considerable light is required. Thus, it is clear that the most desirable and efficient photographic flare for such work is one having a very high intensity for a short period of time. Such flares have been developed. Figure 2 shows a typical intensity-time characteristic curve for such a flare. From this curve it can be seen that the effective illuminating period of the flares is extremely short duration, being only about 0.05 second for the example shown. Assuming that a light intensity value of 30 per cent of the peak value of illumination of the flare is necessary to operate the shutter release mechanism, which value is reached in about 0.0016 second after the flare ignites, it can be seen that the duration of a major portion of the flare's illumination lasts only for about 0.03 second from the point A on the curve at which the flare reaches the 30 per cent relative intensity value. If a shutter release mechanism of the type heretofore available is used which requires at least 0.02 second to start opening the shutter, it can be seen from the curve shown in Figure 2 that a major portion of the flare's illumination will be dissipated before the shutter starts opening; that is, the flare's intensity will have passed the point of peak illumination and be dropping rapidly when the shutter starts to open, as illustrated at point C on the curve. In accordance with the present invention, however, the shutter may be operated within 0.001 second of the time that the flare illumination reaches the 30 per cent value necessary to actuate the phototube 20, so that the shutter will operate before the flare reaches peak illumination, for example at the point B on the curve in Figure 2, so that the major portion of the illumination available can be used effectively. The increased efficiency possible by the used of my invention may be readily perceived in Figure 2 by comparing the area under the curve between the vertical lines BF and DG which represents the proportion of the total available light actually utilized in making a photograph with an automatic shutter actuating mechanism embodying my invention, with the smaller area under the curve between the vertical lines CH and EJ which represents the amount of light of the total available which is actually utilized by automatic shutter actuating mechanism heretofore known.

This comparison shown in Figure 2 also illustrates that, in accordance with my invention, it is possible to use high intensity explosive flares that burn out in a much shorter time than those now used, thereby permitting a much greater average intensity of illumination during the period of exposure, and, under war conditions, making detection of the plane from which the flare is dropped much more difficult.

It is of course obvious that mechanism in accordance with this invention can be provided to operate any apparatus which must be operated substantially instantaneously in response to some impulse of current, potential, radiant energy, or other characteristic or function.

As many embodiments may be made in the above invention and as many changes may be made in the embodiment above described, it is to be understood that all matter hereinbefore set forth as shown in the accompanying drawing is to be interpreted as illustrative only and not in a limiting sense.

I claim:

1. Synchronizing apparatus for night aerial photography for automatically operating a camera shutter in synchronism with the flash of an aerial flare, comprising, in combination, a phototube directed toward the area to be illuminated by a flare, a camera shutter operating mechanism, means biasing said shutter mechanism toward operative position, armature means forming a portion of said shutter operating mechanism, electro-magnetic means for holding said armature in such a position as to hold said shutter operating mechanism in non-operative position against the force of said biasing means when energized, an electronic device having a cathode and anode and a control electrode, a source of electric power, said electro-magnetic means being interposed in a circuit connecting said anode, cathode and electric power source and adapted to be energized therethrough in a predetermined control potential as applied to said control electrode, circuit means applying said predetermined control potential to said control electrode, a resistor connected from said control electrode to said cathode, said phototube having an anode and a cathode, and a source of electrical potential, said phototube anode being connected to one side of said source of electrical potential and said phototube cathode being connected to the other side of said source and to the cathode of said electronic device, and a condenser connected between said phototube anode and said control electrode to be charged by said source of electrical potential, whereby light from a flare striking on said phototube discharges said condenser and momentarily decreases the potential applied to said control electrode to decrease the anode cathode current of said electronic device and thereby deenergize said magnetic holding means to release said armature means and initiate operation of said shutter mechanism substantially immediately after the light of the flare strikes the phototube.

2. Synchronizing apparatus for night aerial photography for automatically operating a camera shutter in synchronism with the flash of an aerial flare, comprising, in combination, a phototube directed toward the area to be illuminated by a flare, a camera shutter operating mechanism, means biasing said shutter mechanism toward operated position, an electro-magnetic holding device including a magnetic circuit of high permeability having a non-magnetic gap, a winding for energizing said magnetic circuit, a magnetic armature member of high permeability positioned to bridge said non-magnetic gap in said magnetic circuit and to be magnetically held thereacross when said winding is energized, biasing means applying to said armature a large force tending to move it from its position bridging said non-magnetic gap, mechanical means attaching said armature member to said shutter operating mechanism, an electronic device having a cathode, an anode and a control electrode, a source of electric power, said winding being interposed in a circuit connecting said anode, cathode and electric power source to be energized therethrough when a predetermined control potential is applied to said control electrode and to be deenergized by a decrease in the anode current of said device caused by a change in said control potential, circuit means normally applying said predetermined control potential to said control electrode, said phototube being connected to said circuit means and responsive to the flash of an aerial flare to alter the electrical characteristics of said circuit means to change said control potential and decrease the anode current of said electronic device to deenergize said magnetic holding device, whereby light from a flare impinging on said phototube causes said magnetic holding device to release said armature member and initiate operation of said shutter mechanism under the force of said biasing means substantially immediately after the light of a flare strikes the phototube.

3. Synchronizing apparatus for night aerial photography for automatically operating a camera shutter in synchronism with the flash of an aerial flare, comprising, in combination, a phototube directed toward the area to be illuminated by a flare, a camera shutter operating mechanism, means biasing said shutter mechanism toward operated position, armature means associated with said shutter operating mechanism, electro-magnetic means for holding said armature in such a position as to hold said shutter operating mechanism in non-operated position against the force of said biasing means when said electromagnetic means is energized, an electronic device having a cathode and anode and a control electrode, a source of electric power, said electromagnetic means being interposed in a circuit connecting said anode, cathode and electric power source and adapted to be energized therethrough when a predetermined control potential is applied to said control electrode and to be deenergized by a decrease in the anode current of said device caused by a change in said control potential, circuit means applying said predetermined control potential to said control electrode, said phototube being connected to said circuit means and responsive to the flash of an aerial flare to alter the electrical characteristics of said circuit means to change said control potential and decrease the anode current of said electronic device to immediately deenergize said electro-magnetic holding means, whereby the light from a flare impinging on said phototube causes said electro-magnetic holding means to release said armature means and initiate operation of said shutter mechanism substantially immediately after the light of a flare strikes the phototube.

HERBERT C. ROTERS.